(12) United States Patent
Jain et al.

(10) Patent No.: US 11,733,785 B2
(45) Date of Patent: Aug. 22, 2023

(54) STYLIZING TEXT BY PROVIDING ALTERNATE GLYPHS

(71) Applicant: ADOBE INC., San Jose, CA (US)

(72) Inventors: Arushi Jain, Delhi (IN); Praveen Kumar Dhanuka, Howrah (IN)

(73) Assignee: ADOBE INC., San Jose, CA (US)

( * ) Notice: Subject to any disclaimer, the term of this patent is extended or adjusted under 35 U.S.C. 154(b) by 69 days.

(21) Appl. No.: 16/676,845

(22) Filed: Nov. 7, 2019

(65) Prior Publication Data
US 2021/0141464 A1    May 13, 2021

(51) Int. Cl.
*G06F 40/109* (2020.01)
*G06F 3/023* (2006.01)
*G06F 40/166* (2020.01)

(52) U.S. Cl.
CPC .......... *G06F 3/0236* (2013.01); *G06F 40/109* (2020.01); *G06F 40/166* (2020.01)

(58) Field of Classification Search
None
See application file for complete search history.

(56) References Cited

U.S. PATENT DOCUMENTS

| | | | | |
|---|---|---|---|---|
| 7,228,501 B2 * | 6/2007 | Brown | ................. | G06F 40/109 715/234 |
| 7,710,422 B2 * | 5/2010 | Matskewich | .......... | G09G 5/246 345/467 |
| 7,982,737 B2 * | 7/2011 | Leroy | ................. | G06T 11/203 345/467 |
| 2009/0009519 A1 * | 1/2009 | Sugiyama | ............. | G06F 40/109 345/467 |
| 2017/0323007 A1 * | 11/2017 | Kukreja | ................. | G06F 16/58 |

OTHER PUBLICATIONS

Fonts.com, Fontology, Level 4, ed. Strizver, 6 pages, version from Apr. 28, 2016, retrieved from Internet Archive, https://web.archive.org/web/20160428090843/http://www.fonts.com:80/content/learning/fontology/level-4/fine-typography/locating-alternate-glyphs. (Year: 2016).*

* cited by examiner

*Primary Examiner* — Amelia L Tapp
(74) *Attorney, Agent, or Firm* — Shook, Hardy & Bacon L.L.P.

(57) ABSTRACT

Systems and methods provide for replacing a default glyph in text displayed by an application with a preferred glyph. A preferred glyph is selected and the character value, glyph ID and font of the preferred glyph are extracted from the preferred glyph. The character value of the preferred glyph is then mapped to the glyph ID and font, which is then stored in a priority glyph set. A user can then input text into a document normally using default glyphs of a font. If it is determined that a character value associated with a default glyph is included in the priority glyph set, the default glyph is replaced by a preferred glyph. Additionally, suggestion glyphs may be presented to a user based on, at least, the character value, glyph ID, and font of a selected glyph.

20 Claims, 14 Drawing Sheets

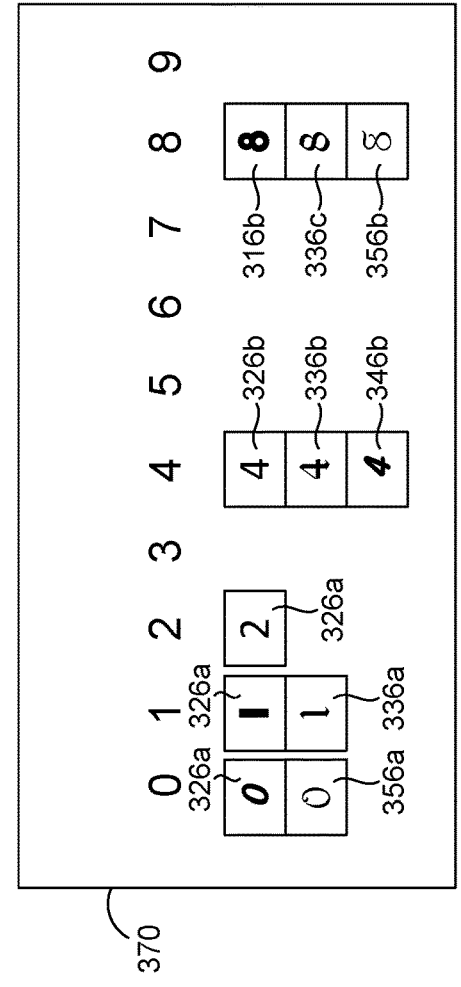

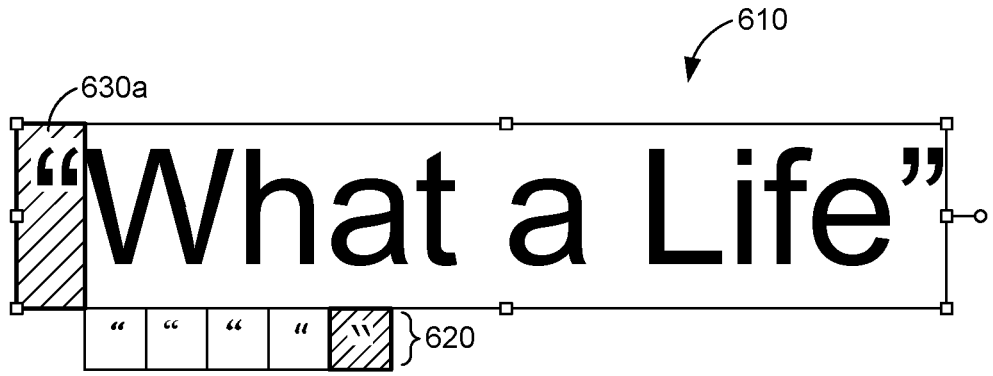
FIG. 6A.
FIG. 6B.
"What a Life"
FIG. 6C. 640

STYLIZING TEXT BY PROVIDING ALTERNATE GLYPHS

BACKGROUND

Some computer typeface formats can offer a set of fonts with alternate character glyphs that share common design features. Changes to the design features can offer a different style and provide a user with the ability to alter the tone of a string of text in a document. Depending on the tone the user wishes to set, a user may prefer a particular glyph (i.e., stylized character) over another. While there are a wide variety of alternate glyphs for a user to select, conventional content editing applications typically require users simply to select a font and use the default character glyphs for the font when typing via an input device. If a user wishes to use a particular glyph different from the default glyph, the user must undertake a tedious and time consuming effort to replace individual default glyphs with preferred glyphs.

SUMMARY

Various aspects of the technology described herein are generally directed to systems, methods, and computer storage media, for among other things, allowing users to stylize text using preferred glyphs by employing an efficient and intuitive process of substituting preferred glyphs in the place of default glyphs of a font. In particular, an alternate glyph system in a computing environment according to the present disclosure maps characters (e.g., 'R') to preferred glyphs based on assigning a character value associated with a character to a preferred glyph and storing the preferred glyph in a priority glyph set. The operations of the present technology are executed to replace the default glyph of a font with a preferred glyph from the font or from a different font. In this way, the alternative glyph system and method of the present disclosure supports overriding any font while working in a document in an application running in the computing environment. The present system and method can also support determining the most appropriate alternate glyphs for a default glyph of a font based on glyph attributes of the default glyph. In this regard, the alternative glyph system and method can provide suggested alternate glyphs to a user to save the user from manually searching through each of the available glyphs in the alternate glyph system to identify a suitable alternate glyph that presents a stylistic appearance of a character the user desires. Further, it is important to provide users with simple and time saving methods of replacing default glyphs with preferred glyphs, which conventional content editing applications offering typesetting capabilities have failed to provide thus far.

By way of background, in content editing applications (e.g., Microsoft Word, Adobe Illustrator, etc.), in order to provide users with a variety of typesetting features, font designers have created an assortment of fonts. A single font can have multiple glyphs for a given character. The term "character" represents the general concept of a letter, number, symbol, ideograph, or the like. A "glyph" refers to a specific instance or rendering (e.g., shapes) of a character in a font, where each glyph has different typographic features applied. For example, a glyph for the character 'R' in font "Arial" (i.e., R) includes typographic features that are different from typographic features for the same character in font "Courier" (i.e., R). Similarly, there can be alternate representations of the same character (e.g., alternate glyphs) with different alternates within the same font. Depending on the use context of a document, a user may prefer one rendering of the character 'R' over another. Manually replacing instances of glyphs with preferred glyphs is often labor intensive and time consuming.

Conventional content editing applications that support alternate glyphs lack support for replacing default glyphs in a font with preferred alternate glyphs from a different font in real-time while a user is inputting text. In one conventional implementation, some content editing applications offer users the ability to select a range of text and apply alternate rule sets (e.g., stylistic sets) that are pre-defined by a typeface designer. These rule sets may replace a particular set of glyphs with specific alternate glyphs as defined by the typeface designer. For example, a user may wish to change the glyph for the character 'a' in a string of text to an alternate glyph. If the user selects a rule set, the glyph for the character 'a' will change to the alternate glyph defined in the rule set; however, in addition to the character 'a' changing, all other rules associated with the rule set will also be applied to the string of text (e.g., an alternate glyph for character 'e' may be applied to the string). The user is unable to disable individual rules within the rule set. It is not always desirable to have all the rules of a rule set activated, and being constrained to the rules of the rule set may cause unwanted changes to the string of text. As such, a user is forced to adopt all the rules of the rule set, none of the rules, or manually change each incidence of character 'a'.

For at least these reasons, there are numerous occasions where users simply will not or are not able to take advantage of alternate glyphs that would help them better stylize text and create a desired design. Alternatively, a user can manually replace a glyph in a string of text with a preferred alternative glyph by selecting (e.g., highlight or double-click) each individual occurrence of the glyph and navigating through a series of menus to locate the preferred alternate glyph. However, depending on the length of the document, there may be many glyphs the user wants to replace. As such, it can be a confusing and time-consuming task to replace each glyph with a preferred glyph in a string of text. This often discourages users from taking advantage of alternate glyphs, and as a result, many users will not take the trouble of replacing default glyphs in a font and will settle for an undesired design.

Aspects of the technical solution described in the present disclosure are directed towards improving selection of alternate glyphs of characters in conventional systems by providing real-time replacement of default glyphs in a font in an alternate glyph system in a computing environment. In particular, a glyph replacement engine of an alternate glyph system in a computing environment maps characters (e.g., 'R') to preferred glyphs based on assigning a character value associated with a character to a preferred glyph and storing the preferred glyph as an element in a custom glyph set.

In operation, the priority glyph set stores preferred glyphs mapped to character values which can replace a default glyph representation with a preferred glyph while typing in real-time. The glyph replacement engine of the alternate glyph system can receive a selection of a preferred glyph that corresponds to a character in a preferred font. The character can be associated with a character value (e.g., Universal Coded Character Set—"Unicode"—value). Further, glyph attributes, such as the character value, glyph ID, and font ID, can be extracted from the preferred glyph. The character value can be mapped to the glyph ID and font ID for the preferred glyph. The mapping for the preferred glyph can then be stored as an element in a priority glyph set within the alternate glyph system of the present disclosure.

In this way, when the alternate glyph system receives a selection to input a character using an active font, that is different from the preferred font, the system may access the priority glyph set and determine whether the character value associated with the input character is included in the priority glyph set. If it is determined that the character value is included in the priority glyph set, the glyph replacement engine in the present alternate glyph system renders the preferred glyph for the character based on determining the character value for the character is included in the priority glyph set and the character value is mapped to the preferred glyph. Further, alternate glyph sets may be presented as a suggested glyph set. For example, when a user selects a particular character, rather than automatically replacing the default glyph, the alternate glyph system may present a suggested glyph set that includes alternate glyphs that are related to the selected glyph. Additional aspects of the technical solution are described below, by way of exemplary implementations, with reference to technical solution environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3A-3C illustrate the process of selecting preferred glyphs for a priority set.

FIGS. 6A-6C illustrate an exemplary user experience for replacing a glyph in a string of text with a suggested alternate glyph.

DETAILED DESCRIPTION

Figure 1:
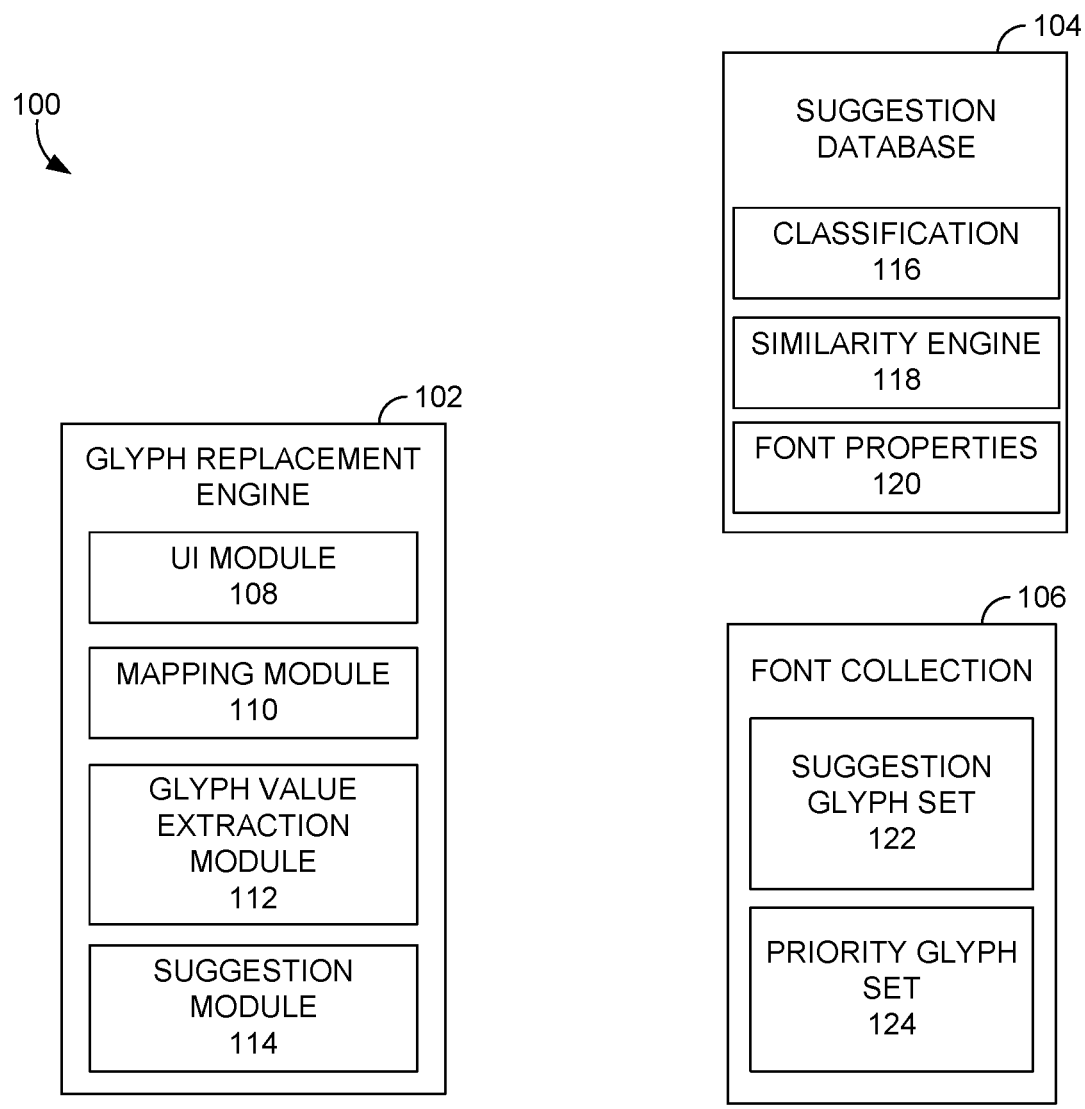
FIG. 1 illustrates an exemplary technical solution environment suitable for implementing embodiments of the technical solution.

Content editing applications offer typesetting capabilities to provide users with the ability to customize characters of a string of text in the content editing application. In some content editing applications, in order to customize the characters, fonts and alternate glyphs for characters are provided within the content editing application. Depending on the use context of a document, a user may prefer one rendering of a character over another. Manually replacing glyphs with preferred glyphs is often tedious and time consuming.

By way of background, in content editing applications there exists no simple method of substituting an alternate glyph for a character while typing in a document. Keys and key combinations input from a keyboard are represented by character values (e.g., Unicode values) which are associated with glyphs in a font. When typing in a document in a content editing application, the user selects a font to use for text input in the document. The font includes predefined default glyphs for characters, and associated character values. For example, when a user types the character 'R' on a keyboard, the content editing application will receive the character value associated with the character 'R', determine the selected user font and render the default glyph for the character based on character value and the selected font. Computer keyboards cannot provide simple key combinations for all glyphs available for a character. As a result, when a user wishes to replace a default glyph for a character, the user must manually replace the default glyph by either selecting the glyph and navigating through a set of menus to find a preferred glyph for the character, or applying a set of predefined rule sets that cannot be modified to the entirety of the document. With large documents, it can be incredibly time consuming for a user to replace each instance of a default glyph with a preferred glyph and many users will not take the time to stylize their content by replacing default glyphs with the user's preferred glyphs. Moreover, rule sets may include rules the user does not wish to implement for certain characters in the document.

A glyph refers to a specific instance or rendering (e.g., shapes) of a character, symbol or other grapheme (e.g., smallest meaningful unit of a writing system of any given language) in a font, where each glyph has different typographic features applied. Each font in a typeface (i.e., font family) comprises a set of glyphs which have a similar weight, style, condensation, width, slant, italicization, ornamentation, and designer. For a particular font, a font designer may create numerous glyphs for a character, but will define a single glyph as a default glyph for each character available in the font. The default glyph for a character is the glyph that will render by default when the system receives a character input. The non-default glyphs of a font are referred to herein as alternate glyphs. As such, a single character in a font may have a default glyph and may also be associated with a number of alternate glyphs. For example, the character 'R' in the Times New Roman font has a default glyph associated with the character 'R' and the Times New Roman font also has numerous alternate glyphs associated with the character 'R,' each of which are slightly different renderings of the character 'R'. Nonetheless, the default glyph for the character 'R' and the alternate glyphs for the character 'R' are all included in the Times New Roman font and each may be associated with the same character value for the character 'R'.

Conventional content editing systems that support alternate glyphs lack support for replacing default glyphs in a font with preferred glyphs while inputting text in real-time. A preferred glyph is a user favored glyph. As used herein, a preferred glyph may be any glyph included in any available font. For example, a preferred glyph may be a default glyph from a particular font or a preferred glyph may be an alternate glyph from a particular font. In one conventional implementation, some content editing applications offer users the ability to select a range of text and apply alternate rule sets (e.g., stylistic sets) that are pre-defined by a typeface designer. These rule sets may replace a particular set of glyphs with specific alternate glyphs as defined by the typeface designer. For example, a user may wish to change the default glyph for the character 'a' in a string of text to an preferred glyph found in a rule set. If the user selects the rule set, the glyph for the character 'a' will change to the preferred glyph; however, in addition to the character 'a' changing, all other rules associated with the rule set will also be applied to the string of text (e.g., an alternate glyph for character 'e' may be applied to the string). It is not always desirable to have all the rules of the rule set activated, and being constrained to the rules of the rule set may cause unwanted changes to the string of text. Further, users are unable to disable rules within a rule set. As such, a user is forced to adopt all the rules of the rule set or manually change each default glyph of a character to a preferred glyph for the character. That is, a user can manually replace a default glyph in a string of text with a preferred glyph by selecting (e.g., highlight or double-click) each individual occurrence of the default glyph and navigating through a series of menus to locate the user's preferred glyph (e.g., alternate glyphs or default glyphs from a different font). However, depending on the length of the document, there may be many default glyphs the user wants to replace. As such, it can be a confusing and time-consuming task to add preferred glyphs in a string of text. This often discourages users from taking advantage of the time to navigate through the numerous available glyphs, and as a result, many users will not take the trouble of replacing default glyphs with preferred glyphs. Thus, a different approach for substituting preferred glyphs that provides a user with the ability to alter the tone of a string of text in a document would improve computing operations and enable a more streamlined and efficient application of stylizing text with preferred glyphs.

Embodiments of the present invention are directed to streamlined and efficient methods, systems, and computer storage media for creating priority glyph sets to provide users with an easy and intuitive way to replace default glyphs with preferred glyphs when creating content. In particular, an alternate glyph system can store a preferred glyph as an element in a data structure (e.g., priority glyph set) based on mapping a character value to the preferred glyph. Further, the present disclosure can access a suggestion database and, based on a selected glyph, provide suggested (or "suggestion") glyphs.

Aspects of the technical solution can be described by way of examples and with reference to FIG. 1. FIG. 1 illustrates an exemplary technical solution environment suitable for implementing embodiments of the technical solution. Generally, the technical solution environment includes a technical solution system for glyph replacement operations using a glyph replacement engine. With reference to FIG. 1, the alternate glyph system 100 includes a glyph replacement engine 102, operable to replace glyphs displayed in text with preferred and/or suggested glyphs. The system 100 also includes a font collection 106. The font collection includes a number of different fonts. It should be understood that in practice, the font collection can have any number of different fonts. Each font can include one or more glyphs (e.g., default and alternative glyphs) for each character in the font with different typographic features applied to the glyphs. The system 100 also includes a suggestion database 104. The suggestion database includes a number of suggestion glyphs that are organized in various ways.

As shown in FIG. 1, the glyph replacement engine 102 includes a UI (user interface) module 108, a mapping module 110, a glyph value extraction module 112, and a suggestion module 114. The suggestion database 104 includes a classification database 116, a similarity engine 118, and a font properties database 120 which each include collections of alternate glyphs that may be organized based on font classifications (e.g., Sans Serif Fonts, Handwritten Fonts, Decorative Fonts, etc.), font similarities (e.g., based on a convolutional neural network), and font properties (e.g., weight, width, contrast, etc.). The font collection 106 includes a suggestion glyph set 122 and a priority glyph set 124.

The glyph replacement operations of the technical solution described herein support replacing default glyphs with preferred glyphs. The glyph replacement operations are implemented using a glyph replacement engine (i.e., glyph replacement engine 102, UI Module 108, mapping module 110, glyph value extraction module 112, and suggestions module 114) that supports glyph replacement operations that are executed to replace default glyphs with preferred glyphs by enabling a user to create a priority glyph set for automatic glyph replacements and by providing suggested glyphs the user may favor over a default glyph.

The UI module 108 supports user interaction with displayed text in order to create custom/suggestion glyph sets, replace default glyphs in the text with preferred glyphs and manage custom/suggestion glyph sets.

The glyph extraction module 112 supports extracting values from glyphs. The glyph extraction module in the glyph replacement engine 102 can receive a preferred glyph and determine a character value, glyph ID and font associated with the preferred glyph. For example, the glyph extraction module may receive a selected glyph and access a font table (e.g., Character to Glyph Index Mapping "cmap" table) associated with the selected glyph to determine the character value, glyph ID and font associated with the selected glyph. A character value is an encoded value for an underlying character (e.g., graphemes and grapheme-like units) rather than glyphs (e.g., renderings) for the character. In text processing, a character value (e.g., Unicode) takes the role of providing a unique code point (i.e., a number, not a glyph) for each character. Character values represent a character in a numeric way and leave the visual rendering (size, shape, font, or style) to software, such as a web browser or word processor. A glyph ID is a value allocated to each glyph by a font creator ranging from zero to N−1, where N is the number of glyphs included in a particular font. The Glyph ID is not, on its own, associated with a character value. Rather, the Glyph ID is used within the font and is specific to the font. A font is a set of glyphs which have a similar weight, style, condensation, width, slant, italicization, ornamentation, and designer. Further, fonts are often formed into a typeface (i.e., font family) and comprise one or more fonts, each including glyphs that share common design features. Fonts and typeface may be interchangeable as used herein.

Additionally, the glyph extraction module 112 may determine a character value for a glyph (e.g., alternate glyph) that is not directly associated with any character value. For example, a default glyph in a font may be associated with a character value and may have one or more alternate glyphs associated with the default glyph. While the alternate glyphs may be available to a user via a set of menus, the alternate glyphs may not be directly associated with the character value. For example, an alternate glyph may only have a glyph ID and a font associated with the alternate glyph. In order to determine the character value for such an alternate glyph, the glyph extraction module 112 may access a font table associated with the alternate glyph and determine the glyph ID and font are not associated with a character value.

Further, the glyph extraction module 112 may determine the default glyph associated with the alternate glyph and determine the character value associated with the default glyph. Thus, based on the alternate glyph being associated with the default glyph, it may be determined that the character value of the default glyph is likewise associated with the alternate glyph.

The mapping module 110 supports mapping character values to a glyph ID and font for a preferred glyph and storing the values as an element in a data structure (e.g., priority glyph set or a suggestion glyph set) based on associating (e.g., mapping) character values to the extracted values for preferred glyphs. An associative relationship between the character value and the preferred glyph (glyph ID and font) may be created by storing these values in an array data structure, such as a table, that can include any number of elements (e.g., rows), where each element (i.e., preferred glyph) in the table may include the extracted character value, glyph ID, and font for the preferred glyph. As mentioned above, preferred glyphs may be any default or alternate glyph from any font available in the computing environment. Further, the data structure may be stored in the font collection of the content editing application. It is also contemplated that the data structure may be stored within a document file, enabling the data structure to travel with the document. Advantageously, a user who receives the document may utilize the preferred glyphs. Additionally, the user may transfer the data structure from one application to another while maintaining the user's preferences.

The data structure may be a priority glyph set 124 in font collection 106. When storing a new preferred glyph in priority glyph set 124, mapping module 110 accesses priority glyph set 124 and determines whether the character value for the new preferred glyph is already included in priority glyph set 124. In operation, if the character value is not included in priority glyph set 124, mapping module 110 may create a new element (e.g., a row in a table) and store the character value, glyph ID and font for the new preferred glyph in priority glyph set 124. If the character value is already included in priority glyph set 124, mapping module 110 may remove the glyph ID and font currently associated with the character value and replace these values with the glyph ID and font associated with the new preferred glyph and store the updated values in priority glyph set 124. This ensures that there exists only a single glyph corresponding to a single character value.

Additionally, the data structure may be a suggestion glyph set 122 in font collection 106. When storing a new preferred glyph in suggestion glyph set 122, mapping module 110 accesses suggestion glyph set 122 and determines whether the character value for the new preferred glyph is already included in suggestion glyph set 122. In operation, if the character value is not included in suggestion glyph set 122, mapping module 110 creates a new element (e.g., a row in a table) and stores the character value, glyph ID and font for the new preferred glyph in suggestion glyph set 122. If the character value is already included in suggestion glyph set 122, mapping module 110 adds the glyph ID and font for the new preferred glyph to the element, such that the character value may now be associated with more than one preferred glyph. For example, a user may add any number of preferred glyphs to suggestion glyph set 122. This enables a user to store one or more frequently used glyphs (e.g., alternate glyphs or a default glyph from a particular font) for a character in suggestion glyph set 122.

The suggestion module 114 supports providing suggestions of alternate glyphs. Suggestion module 114 may receive a selection of a glyph (e.g., default glyph) that is displayed in text. This can be done automatically or in response to user interaction with the glyph (e.g., a user clicking on the glyph or hovering a cursor over the glyph). Suggestion module 114 operates to determine whether there are suggested glyphs for the selected glyph. In some configurations, suggestion module 114 receives a character value for a selected glyph and determines whether the character value is present in suggestion glyph set 122. If the character value is present in suggestion glyph set 122, a list of preferred glyphs associated with the character value of the selected glyph is displayed proximate the selected glyph. If the user selects one of the preferred glyphs in the list, the preferred glyph will replace the glyph that was first selected.

In other configurations, suggestion module 114 identifies the character value, glyph ID and font for the selected glyph. Then, the suggestion module may query the corresponding character value, glyph ID and font in suggestion database 104 to identify or calculate suggestion glyphs for the selected glyph. Based on the identification or calculation of suggestion glyphs, suggestion module 114 provides the suggestion glyphs to UI module 108, which may display a set of suggested glyphs proximate the selected glyph.

As mentioned above, suggestion database 104 includes a classification database 116, a similarity engine 118, and a font properties database 120 which may include collections of suggestion glyphs. Classification database 116 may associate fonts of a particular class (e.g., classification, natural language tags, or properties) using machine learning techniques for determining classifier labels for font datasets. A user may select any combination of the particular classes to enable the selected class of suggestion glyphs. For example, a user may select to enable the natural language tags class and may be presented with "Artistic" or "Dramatic" font suggestions. When providing suggestions from classification database 116, suggestion module 114 first receives the selected class the user wishes to enable for suggestion glyph. Based on the selected class, suggestion 114 determines a list of fonts within the selected class. Moreover, suggestion module 114 receives a selected glyph and character value associated with the selected glyph (e.g., from glyph value extraction module 112) and determines whether the character value exists within the list of fonts for the selected class. If the character value is found within the list of fonts for the selected class, the suggestion glyphs associated with the character value found in the list of fonts are identified by suggestion module 114 and may be displayed to the user proximate the selected glyph. If one of the suggested glyphs is selected by a user, the suggested glyph will replace the glyph that was first selected.

The font properties database 120 consists of a set of metrics associated with characteristics for glyphs in a font. For example, a value may be associated with the description of the visual weight of a glyph (e.g., value 7 may indicate a bold weighting for the glyph). Suggestion module 114 may receive a selected glyph and determine the characteristics associated with selected glyph (e.g., weight, width, contrast) by accessing a table (e.g., OS/2 table) for the glyph's font. To provide suggested glyphs, suggestion module 114 may determine certain characteristics of the selected glyph are the same or similar to suggestion glyphs and provide these suggestion glyphs to the user as suggested glyphs.

The similarity engine 118 operates to determine a suggestion glyph in a font that provides the closest match to a selected glyph by generating feature vectors based on the selected glyph. Similarity engine 118 determines a character group associated with the selected glyph based on information extracted from the selected glyph (e.g., alphabet, lowercase, intellectual property). The character groups may be predefined as shown below in FIG. 7. After determining the character group associated with the selected glyph, similarity engine 118 may compute deep font images (e.g., using a deep neural network) of the glyphs in the character group of the font for the selected glyph. Additionally, similarity engine 118 computes the similarity of the deep font images based on computed vectors corresponding to the glyph images in the character group of other fonts in the character group. Further, glyph suggestions from similar fonts may be provided to the user based on similar fonts and similar glyphs. Suggestion module 114 may utilize a deep learning convolutional neural network to provide suggestions based on similar fonts (e.g., deep font similarity) in a character group. In order to provide similar glyph suggestions, the suggestions module may utilize deep font similarity to consider popular glyphs of fonts for computing font similarity. For example, if a user selects a glyph for character '©,' suggestion module 114 may determine and suggest similar glyphs based on information extracted from the selected character (e.g., the copyright symbol is part of the intellectual property codes character group) and comparing computed feature vectors for the selected glyph to corresponding glyph images from other fonts in the character group.

The glyph replacement engine 102 supports replacing the default glyph of a font with a preferred glyph from a different font. In some implementations, glyph replacement engine 102 running in alternate glyph system 100 can receive a selection of a default glyph that corresponds to a character in a font. Glyph replacement engine 102 can then access a priority glyph set 124 in font collection 106 to determine whether the character value associated with the default glyph is included in priority glyph set 124. If replacement engine 102 determines the character value is included in priority glyph set 124 (and associated with a preferred glyph), replacement glyph engine 102 will replace the default glyph with the preferred glyph.

Figure 2A:
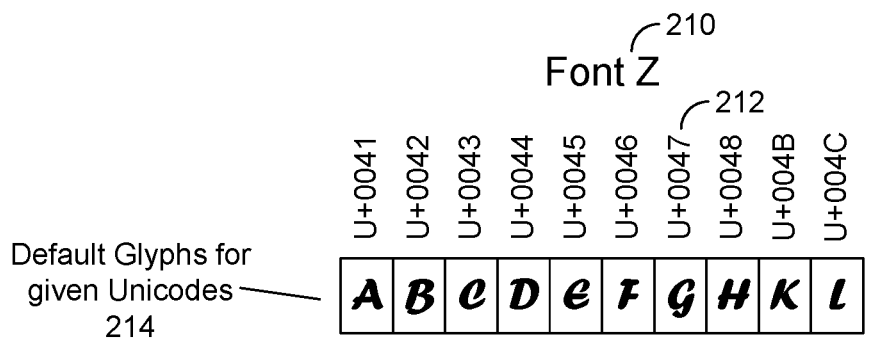
FIGS. 2A-2F are drawings illustrating the process for creating a priority glyph set.
Figure 2B:
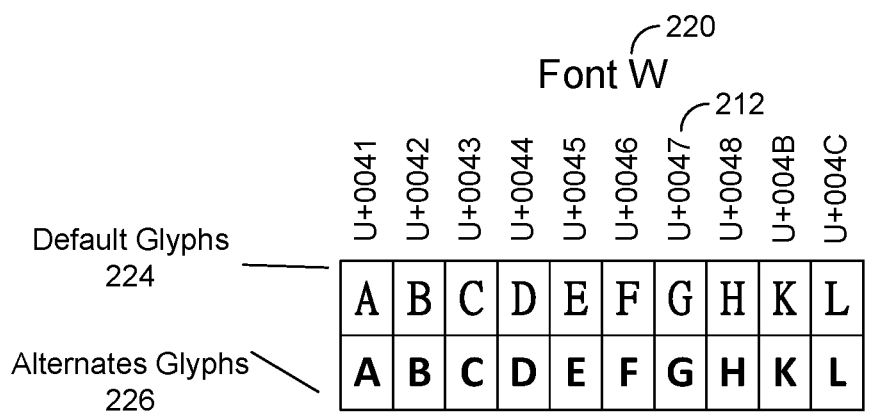
Figure 2C:
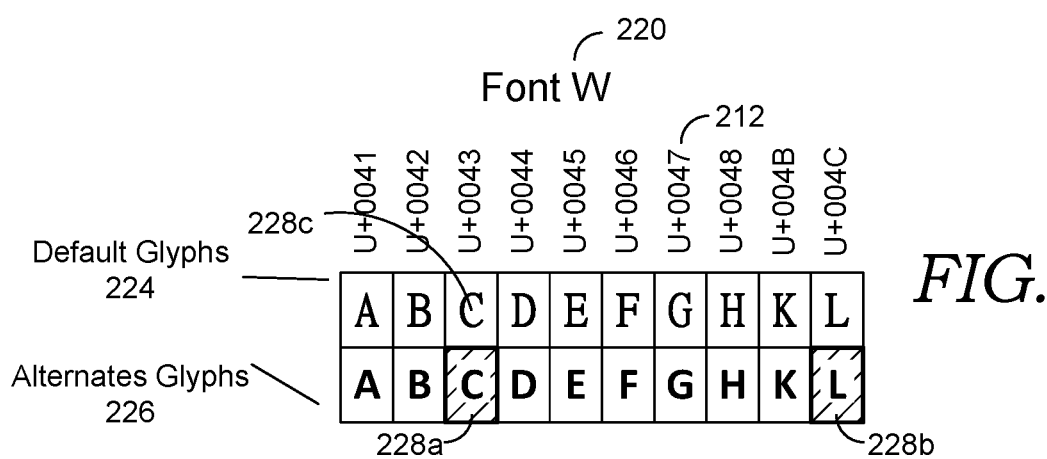
Figure 2D:
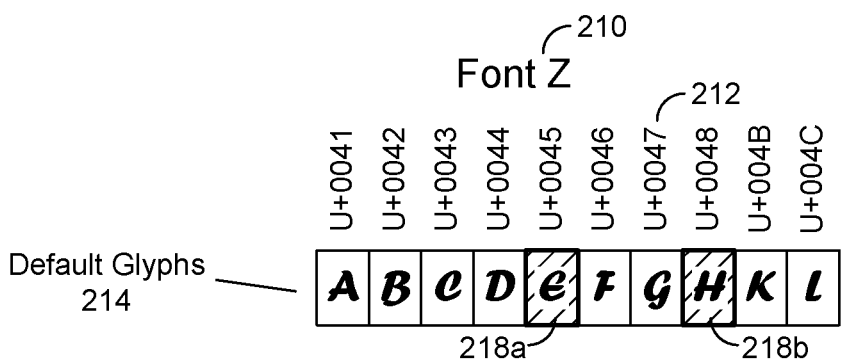

With reference to FIGS. 2A-2F, FIGS. 2A-2F are drawings illustrating the process for creating a priority glyph set according to the present disclosure as described above in connection with FIG. 1. With initial reference to FIG. 2A, FIG. 2A includes Font Z 210 with a set of default glyphs 214 for a set of given character values 212. FIG. 2B includes Font W 220 with a set of default glyphs 224 and a set of alternate glyphs 226 for the set of character values 212. FIG. 2C illustrates a selection of an alternate glyph for Font W 220 for character 'C' 228a and character 'L' 228b. FIG. 2D illustrates a selection of the default glyph for Font Z 210 for character 'E' 218a and character 'H' 218b.

Figure 2E:
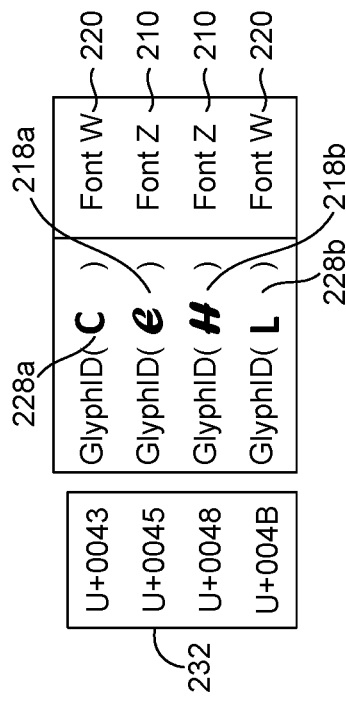

FIG. 2E illustrates an exemplary priority glyph set 230. Priority glyph set 230 includes glyphs 228a, 228b, 218a, and 218b which were selected in FIG. 2C and FIG. 2D. Priority glyph set 230 also includes a column with Font W 220 and Font Z 210. Additionally, priority glyph set 230 includes a column with character values for the selected glyphs. As can be seen in FIG. 2E, each of the selected glyphs and fonts are mapped to their corresponding character value in priority glyph set 230. For example, to provide a mapping, character value U+0043 is included in the same row as the alternate glyph for the character 'C' 228A (which is an alternate glyph for the default glyph 228c, as shown in FIG. 2C.) and Font W 220.

Figure 2F:
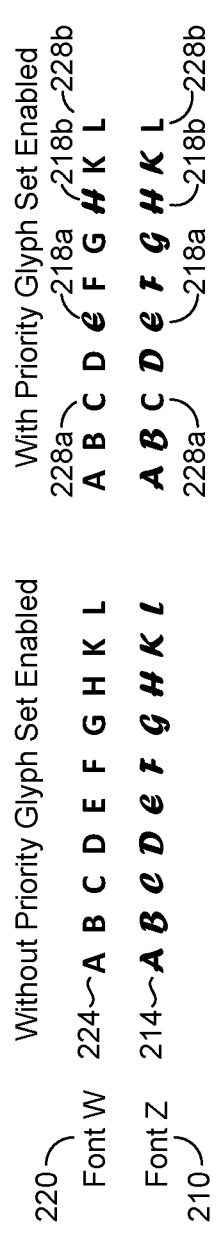

With reference to FIG. 2F, FIG. 2F illustrates utilizing the preferred glyph from the priority glyph set on each instance of an input associated with the character value. When priority glyph set 230 of FIG. 2E is not enabled, default glyphs 224 for Font W 220 and default glyphs 214 for Font Z 210 will render when glyph replacement engine 102 receives an input for a character (e.g., from a keyboard). However, when priority glyph set 230 of FIG. 2E is enabled, glyph replacement engine 102 will reference priority glyph set 230 to determine whether the input for a character (e.g., character value) is included in priority glyph set 230 and render the preferred glyph rather than the default glyph for the character. For example, a user may enable priority glyph set 230 and select Font W to input characters 'ABCDEFGHIJKL' into a document. Based on determining that priority glyph set 230 is enabled, glyph replacement engine 102 will replace default glyphs 224 for characters 'C', 'E', 'H', and 'L' with preferred glyphs 228a, 218a, 218b, and 228b respectively. Thus, the user may enable priority glyph set 230 and type normally using any given font and preferred glyphs stored in priority glyph set 230 will automatically replace corresponding default glyphs in real-time. It is further contemplated that a user may select text in a document and enable priority glyph set 230 for the selected text. Based on the user selecting text and enabling priority glyph set 230, default glyphs in the selected text will be replaced by corresponding preferred glyphs included in priority glyph set 230.

Figure 3A:
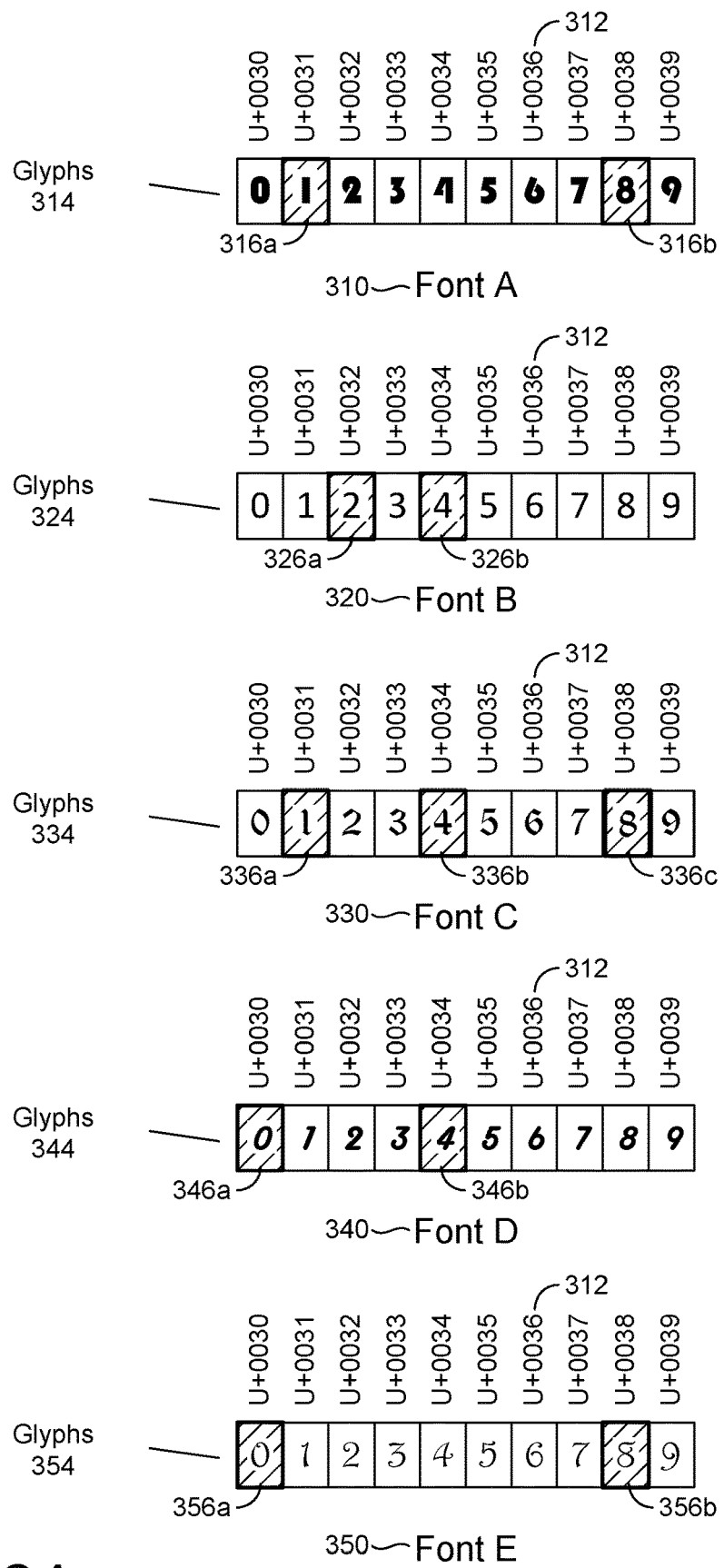

With reference to FIGS. 3A-3C, FIGS. 3A-3C illustrate the process of selecting preferred glyphs for a suggestion glyph set according to the present disclosure. With initial reference to FIG. 3A, FIG. 3A shows Font A 310, Font B 320, Font C 330, Font D 340 and Font E 350, each with their respective default glyphs 314, 324, 334, 344, and 354. Each of the default glyphs in each of the fonts include the same character values 312, which correspond to a particular glyph in each font. In operation, a user may select any number of glyphs from any number of fonts to be included in a suggestion glyph set. For example, a user may select glyphs 316a, 316b, 326a, 326b, 336a, 336b, 336c, 346a, 346b, 356a, and 356b. It should be noted that each of glyphs 316b, 336c, and 356b represent different glyphs for the character '8' and each correspond to the same character value. Turning to FIG. 3B, it can be seen that each of the selected glyphs 316a, 316b, 326a, 326b, 336a, 336b, 336c, 346a, 346b, 356a, and 356b from FIG. 3B can be mapped to the corresponding character values 362 and stored in suggestion glyph set 360. As shown in FIG. 3C, priority suggestions 370 may be enabled by the user to enable suggestion module 114 of FIG. 1 to provide the user with preferred glyphs stored in suggestion glyph set 360 when the user selects a glyph in the text of a document. For example, a user working in a document using a font (e.g., Times New Roman) may select the displayed glyph for character '4.' Then, based on the priority glyph set 360 being enabled, preferred glyphs 326b, 336b, and 346b may be presented to the user to replace the displayed glyph if selected by the user. By way of further example and with reference to FIG. 3C, with priority set 370 enabled in a document, if a user selects a 0, preferred glyphs 326a and 356a may be presented to the user. If the user selects a 1, preferred glyphs 326a and 336a may be presented to the user. If the user selects a 2, preferred glyph 326a may be presented to the user. If the user selects a 8, preferred glyph 316a, 336c, and 356b may be presented to the user.

Figure 4A:
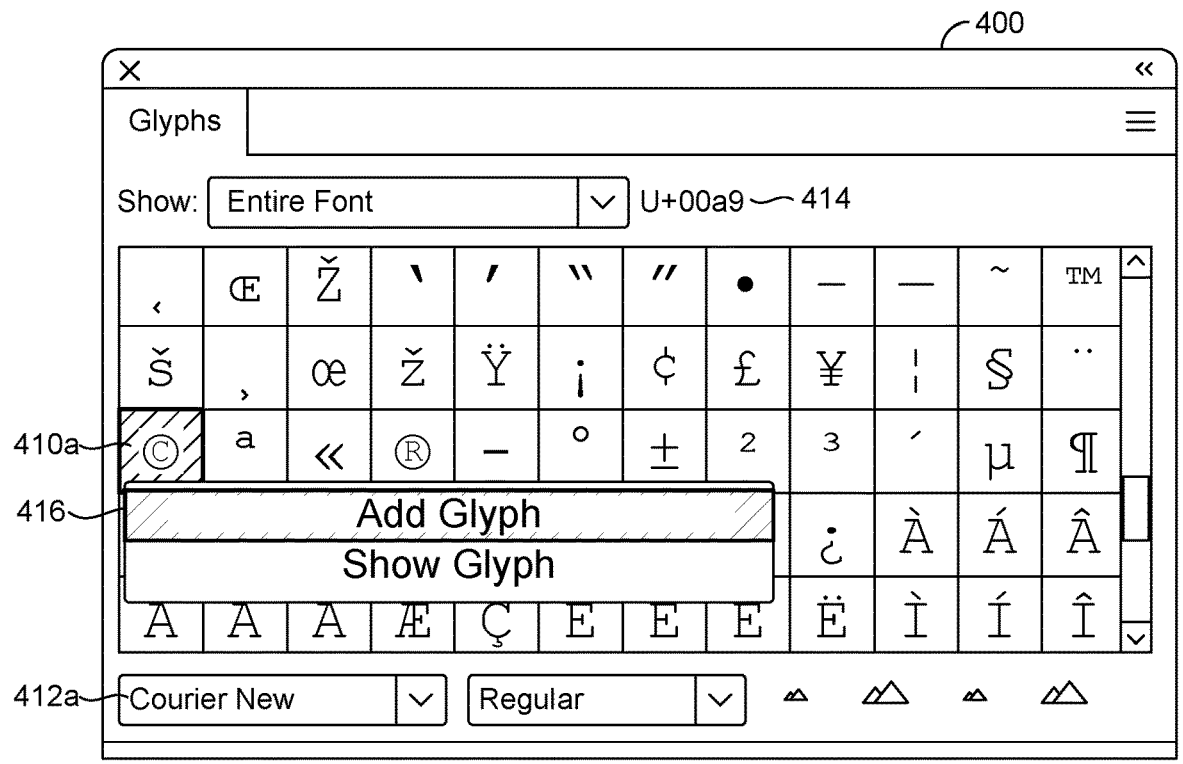
FIGS. 4A-4B illustrate an exemplary user interface for selecting an alternate glyph to be stored as a preferred glyph.
Figure 4B:
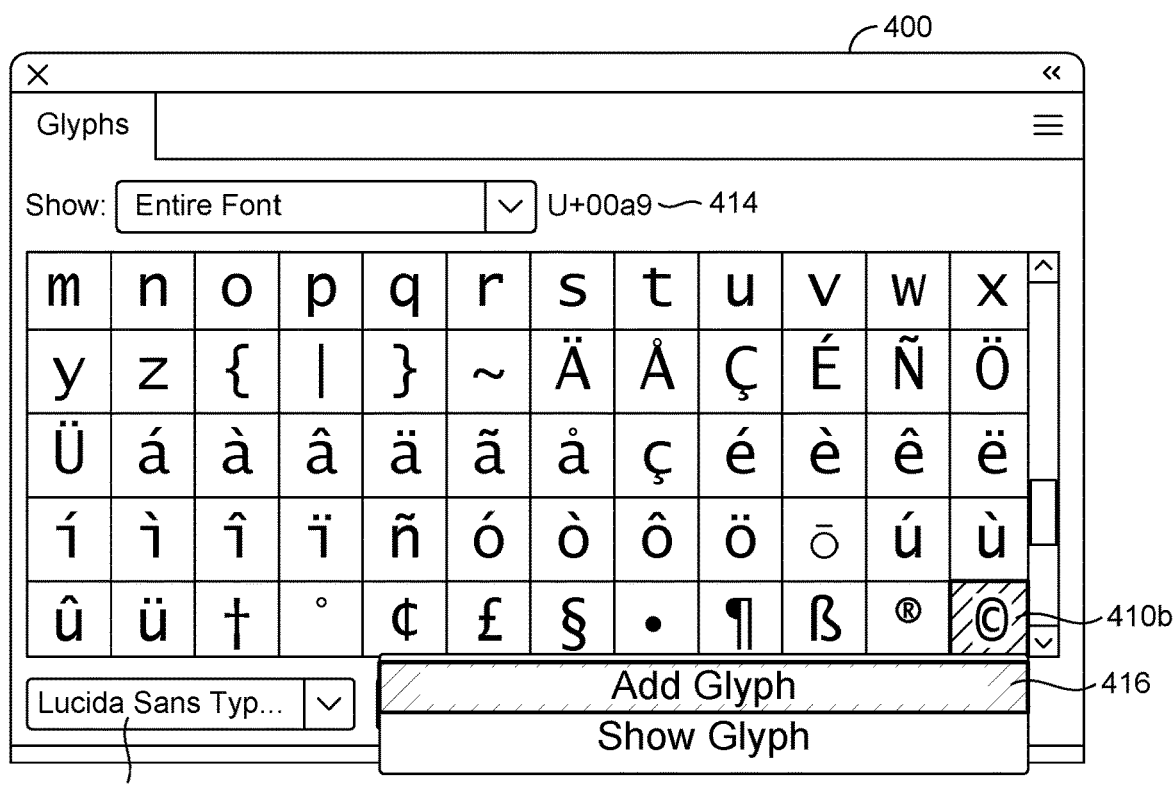

Turning to FIGS. 4A-4B, FIGS. 4A-4B illustrate an exemplary user interface 400 for selecting an alternate glyph to be stored as a preferred glyph. The preferred glyphs may be stored as a priority glyph set, where a single character value is mapped to a single preferred glyph. As described in more detail above, by mapping a single character value to a single preferred glyph, default glyphs may be automatically replaced with preferred glyphs. Alternatively, the preferred glyphs may be stored as a suggestion glyph set, where a single character value may be mapped to one or more preferred glyphs. As described above in more detail, by enabling a user to store multiple preferred glyphs in relation to a single character value, the user may store a collection of frequently used glyphs. For example, glyph 410*a* in font 'Courier New' 412*a* for the character '©,' which corresponds to a character value 414, may be selected by a user in user interface 400 and the user may select from dropdown list 416 to add glyph 410*a* to a priority glyph set or a suggestion glyph set (e.g., as a preferred glyph). Further, in FIG. 4B, the user may select glyph 410*b* in font 'Lucida Sans' 412*b* for the character '©,' which also corresponds to the character value 414, to be added to either the priority glyph set or suggestion glyph set. For example, if glyph 410*a* were added to a priority glyph set as a preferred glyph, character value 414 would be mapped to glyph 410*a* and stored in the priority glyph set. If then, glyph 410*b* were selected to be added to the priority glyph set as a preferred glyph, glyph 410*a* would be replaced by 410*b* and would be mapped to character value 414. Additionally, for example, if glyph 410*a* were added to a suggestion glyph set as a preferred glyph, character value 414 would be mapped to glyph 410*a* and stored in the suggestion glyph set. If then, glyph 410*b* were selected to be added to the suggestion glyph set, glyph 410*b* would be mapped to character value 414 in addition to glyph 410*a*. As such, both glyph 410*a* and glyph 410*b* would be mapped to character value 414 and stored in the suggestion glyph set.

Figure 5A:
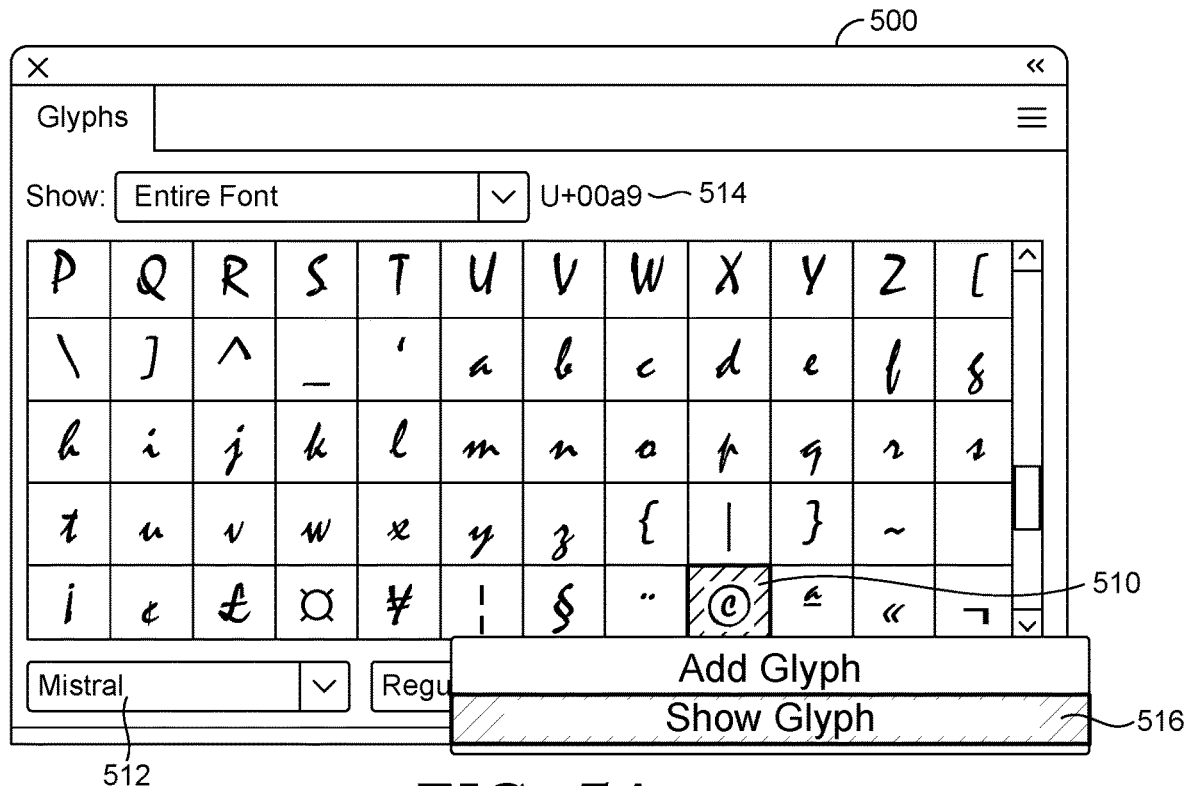
FIGS. 5A-5B illustrate a user interface for displaying all preferred glyphs stored in a suggestion glyph setsuggestion glyph set.
Figure 5B:
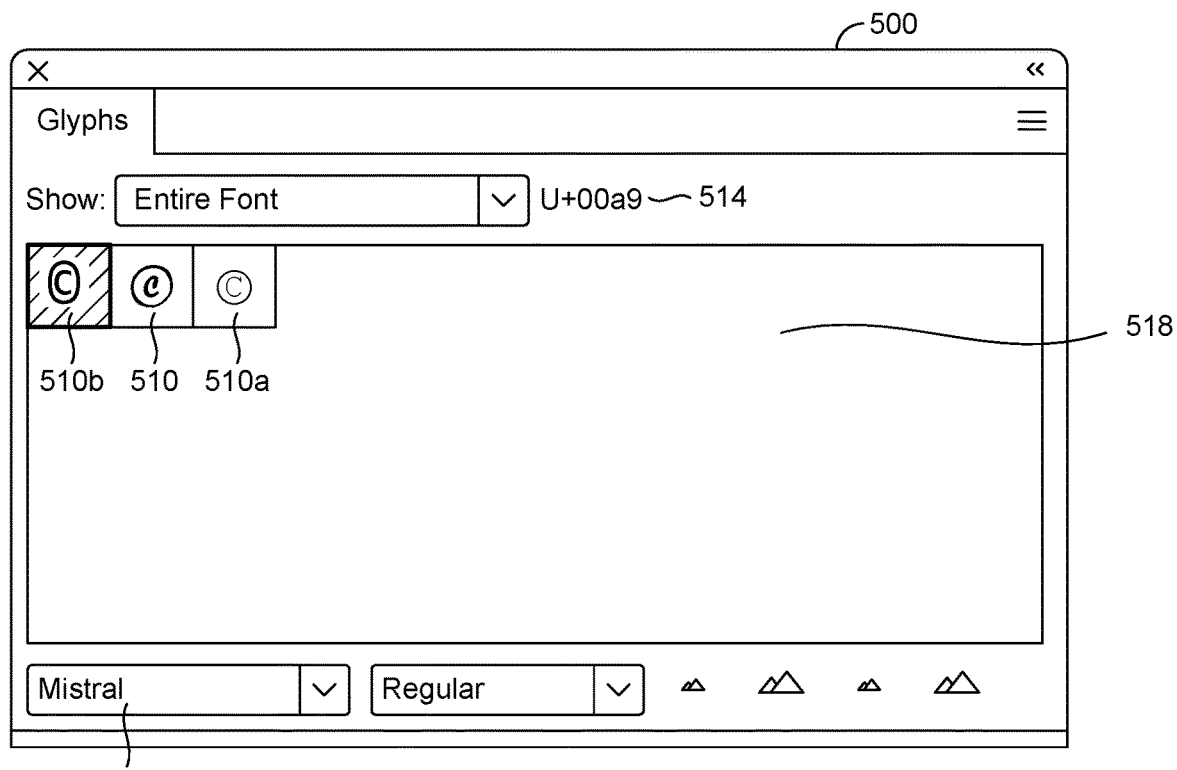

Turning to FIGS. 5A-5B, FIGS. 5A-5B show a user interface 500 for displaying all preferred glyphs stored in a suggestion glyph set. For example, a user may select a glyph 510 in font 'Mistral' 512 for the character '©,' which corresponds to character value 514, and select to view all glyphs stored in priority set 518. The user interface then, as in FIG. 5B, may display the set of glyphs (i.e., 510*b*, 510, and 510*a*) stored in priority set 518, each corresponding to the character value 514.

Figure 5C:
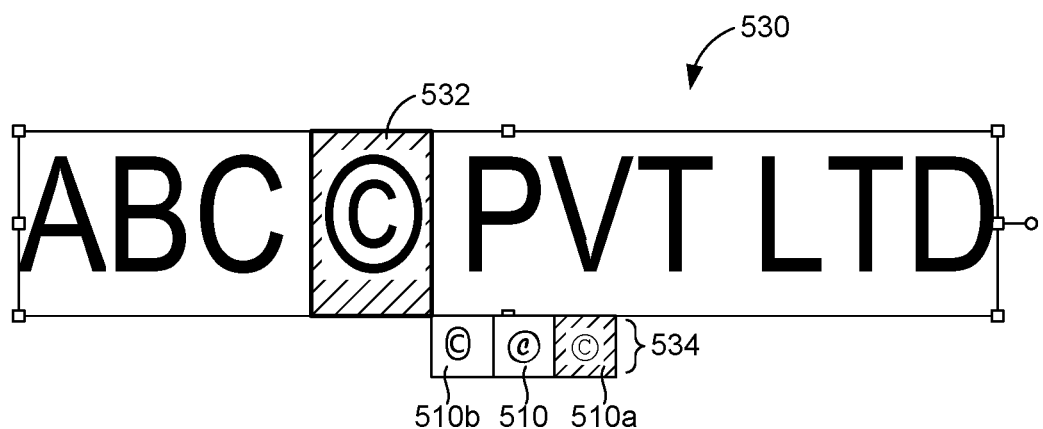
FIGS. 5C-5D illustrate a string of text as may be displayed to a user in a document.
Figure 5D:

FIGS. 5C-5D show a string of text 530 as may be displayed to a user in a document. With priority set 518 enabled, a user may select glyph '©' 532 and the user may be presented with the set of glyphs (i.e., 510*b*, 510, and 510*a*) stored in priority set 518 which correspond to the glyph '©' 532. As discussed above, the glyph '©' 532 corresponds to the set of glyphs 510*b*, 510, and 510*a* stored in priority set 518 based on each of the glyphs (532, 510*b*, 510, and 510*a*) sharing a common character value. As such, when the user selects the glyph '©' 532, the glyph replacement engine 102 of FIG. 1 determines the character value for the glyph and accesses suggestion glyph set 518 to determine whether the character value is included in suggestion glyph set 518. If the character value is included in suggestion glyph set 518, the glyphs mapped to the character value may be presented to the user as suggested glyphs 534 for the selected glyph. If the user selects one of suggested glyphs 534, the current glyph 532 may be replaced by the newly selected glyph. For example, a user may select glyph 510*a* from the set of suggested glyphs 534 in FIG. 5C. As can be seen in FIG. 5D, glyph 510*a* can replace glyph 532 in the string of text based on the user selection.

Turning to FIGS. 6A-6C, FIGS. 6A-6C illustrate an exemplary user experience for replacing a glyph in a string of text with a suggested alternate glyph. For example, in FIG. 6A and FIG. 6B, a user may select a glyph 630*a* or 630*b* representing quotation marks in a string of text 610. Upon selecting glyph 630*a*, a set of suggested glyphs 620 may be presented to the user proximate selected glyph 630*a*. The user may select one of the suggested glyphs in the set of suggested glyphs 620 and the selected suggested glyph will replace the glyph which was first selected (i.e., 630*a* or 630*b*) as shown in FIG. 6C.

Figure 7:
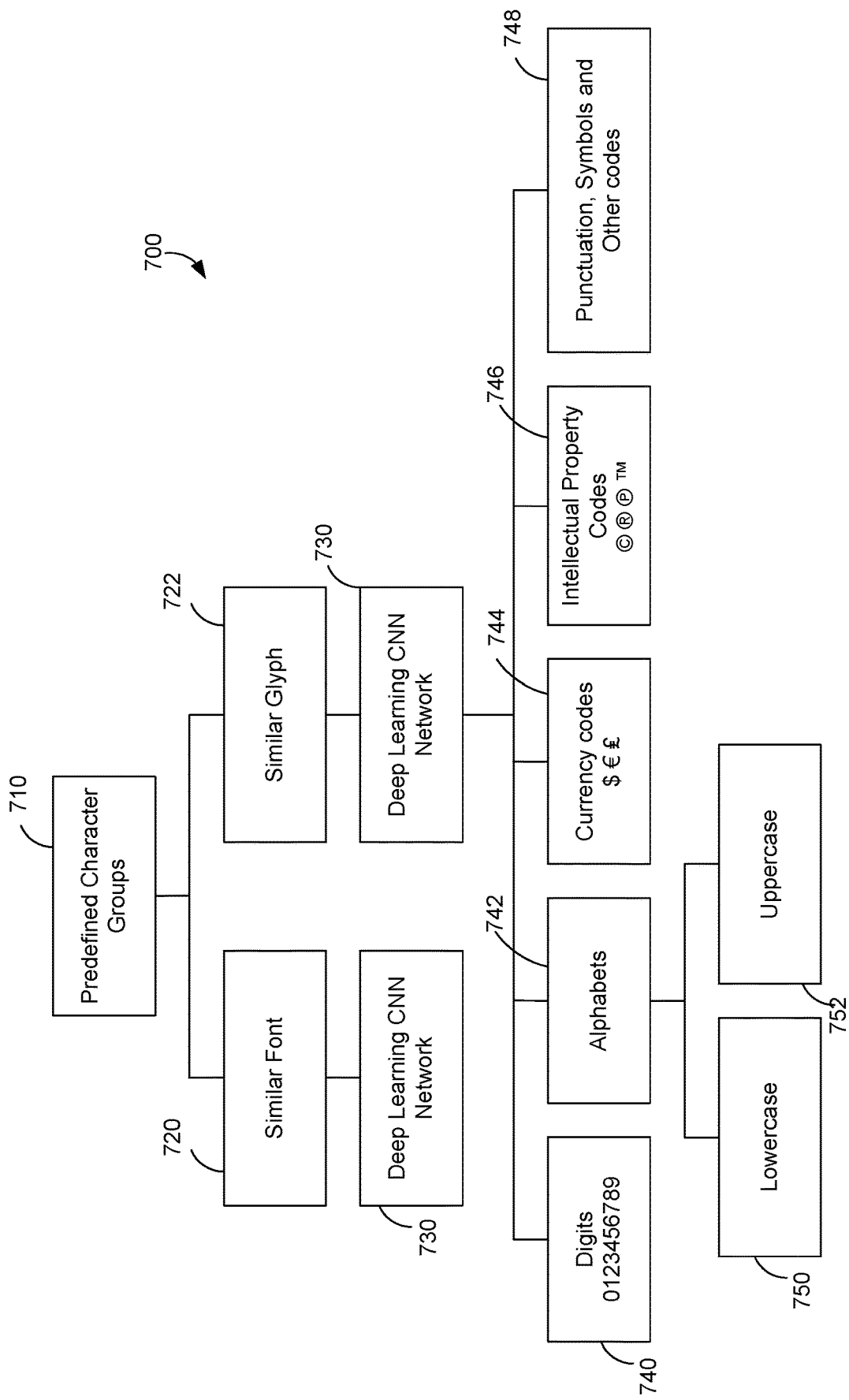
FIG. 7 illustrates an exemplary organizational structure for organizing glyphs based on similarity.

Turning to FIG. 7, FIG. 7 illustrates an exemplary organizational structure, which may be used by similarity engine 118 of FIG. 1 to access predefined character groups 710, which may be organized based on similarity. As shown in FIG. 7, predefined character groups 710 may include character subgroups such as similar font 720, similar glyph 722, digits 740, alphabets 742, currency codes 744, intellectual property codes 746, and punctuation, symbols and other codes 748. Alphabets 742 may further include subgroups for lowercase 750 and uppercase 752 characters.

Initially, character groups may be organized based on similar font 720 or by similar glyph 722. Similar fonts may be determined based on utilizing deep learning convolutional neural network (CNN) 730 to associate fonts based on similar fonts features (e.g., deep font similarity). Additionally, based on utilizing deep learning CNN 730 to associate glyphs based on similar glyph attributes (e.g., output vectors), similar glyphs may be determined. These similar glyphs may be organized into one or more subgroups. Glyphs corresponding to Arabic figures of 1 through 9 and 0 or the symbol of any other number system may be organized into subgroup digits 740. Glyphs corresponding to letters of a language may be organized into subgroup alphabets 742. These glyphs may further be organized based on whether the glyph is uppercase (e.g., capital letters) or lowercase. Uppercase glyphs may be organized into subgroup uppercase 752 and lowercase glyphs may be organized into subgroup lowercase 750. Glyphs corresponding to symbols used as shorthand for a currency name may be organized into subgroup currency codes 744. Glyphs corresponding to various types of intellectual property protection (e.g., ®, ©, ™) may be organized into subgroup intellectual property codes 746. Glyphs corresponding to other symbols, such as period, comma, parentheses, or other marks used in writing to separate sentences and their elements and to clarify meaning may be organized into subgroup punctuation, symbols and other codes 748 along with any other miscellaneous glyphs.

Figure 8:
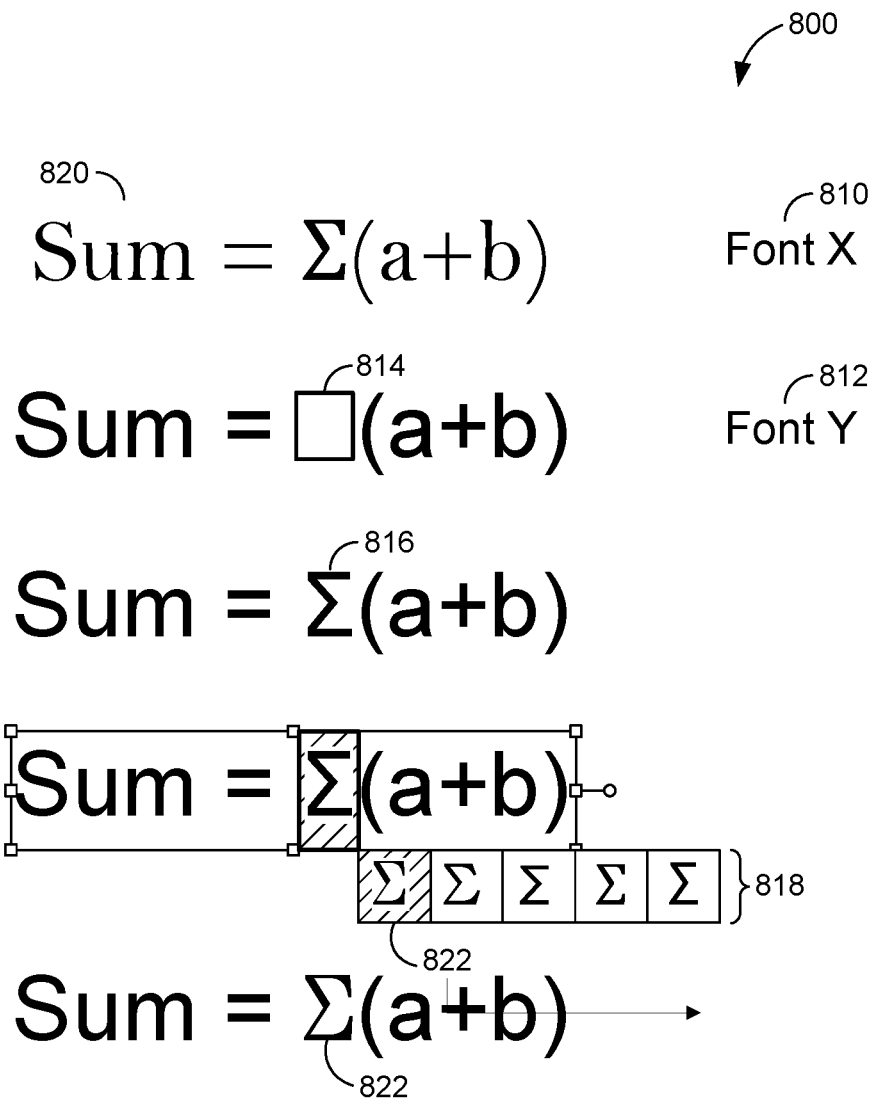
FIG. 8 illustrates a workflow for missing glyphs.

Turning to FIG. 8, FIG. 8 illustrates a workflow 800 for missing glyphs. The string of text 820 may be input into a document using Font X 810. The user may change the font of the text 820 to Font Y 812. However, the sigma symbol may be missing in Font Y, resulting in a blank space or blank box 814 where the sigma symbol should be present. The glyph replacement engine 102 as described above in connection with FIG. 1 may replace the blank box 814 with a default glyph 816 for the document. As the default glyph for the document likely does not match the style of Font Y, suggestion module 114 may detect the default glyph has been used to replace the blank box and access the suggestion database 104 to provide a set of suggested glyphs 818 based on the features of Font Y. Thus, the user may select suggested glyph 822 that is similar to the styling of Font Y. This provides the user with easy access to similar glyphs without having to navigate a series of menus to find a glyph that matches the glyphs for Font Y.

Figure 9:
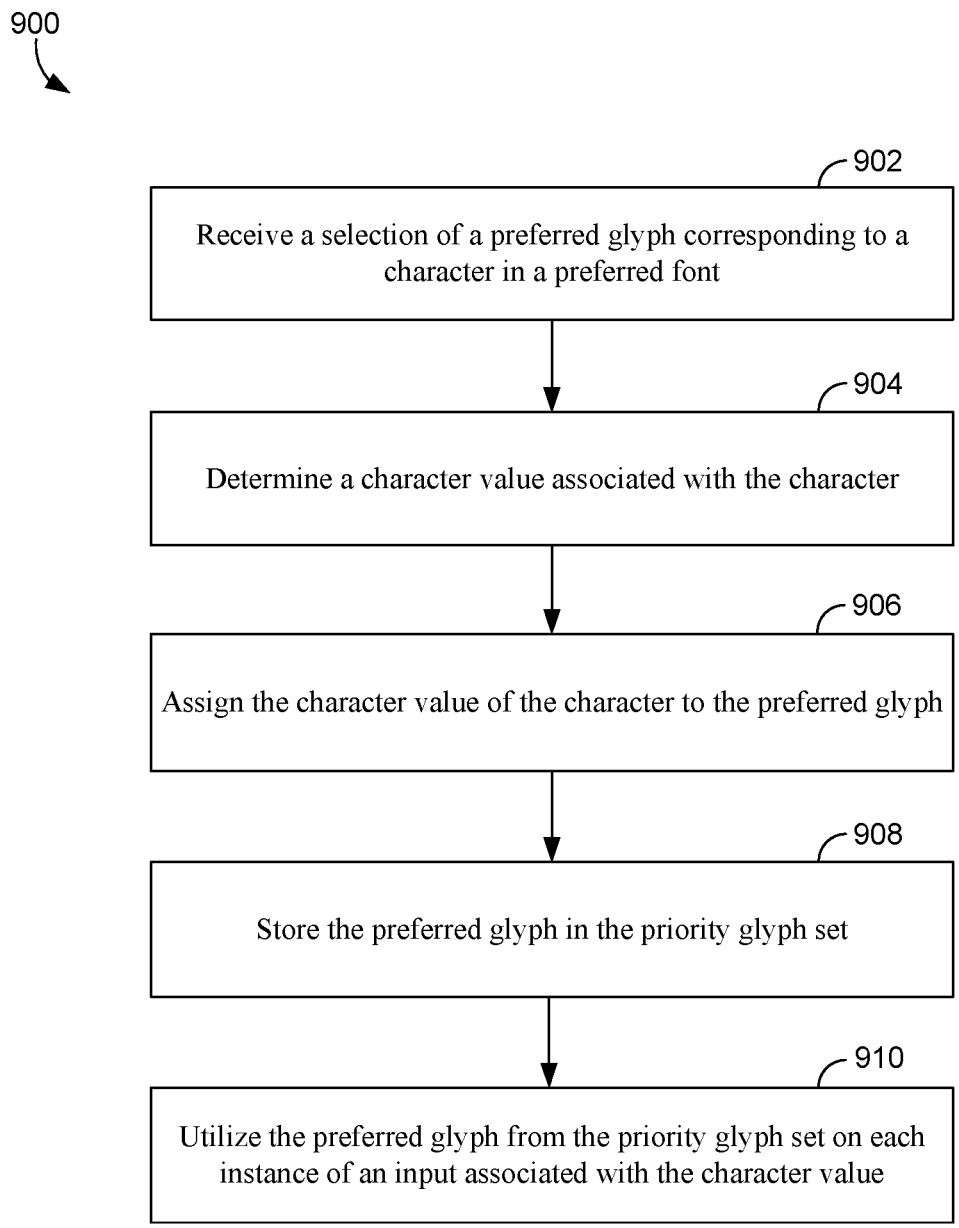
FIG. 9 is a flow diagram showing a method for storing a preferred glyph in a priority glyph set.
Figure 10:
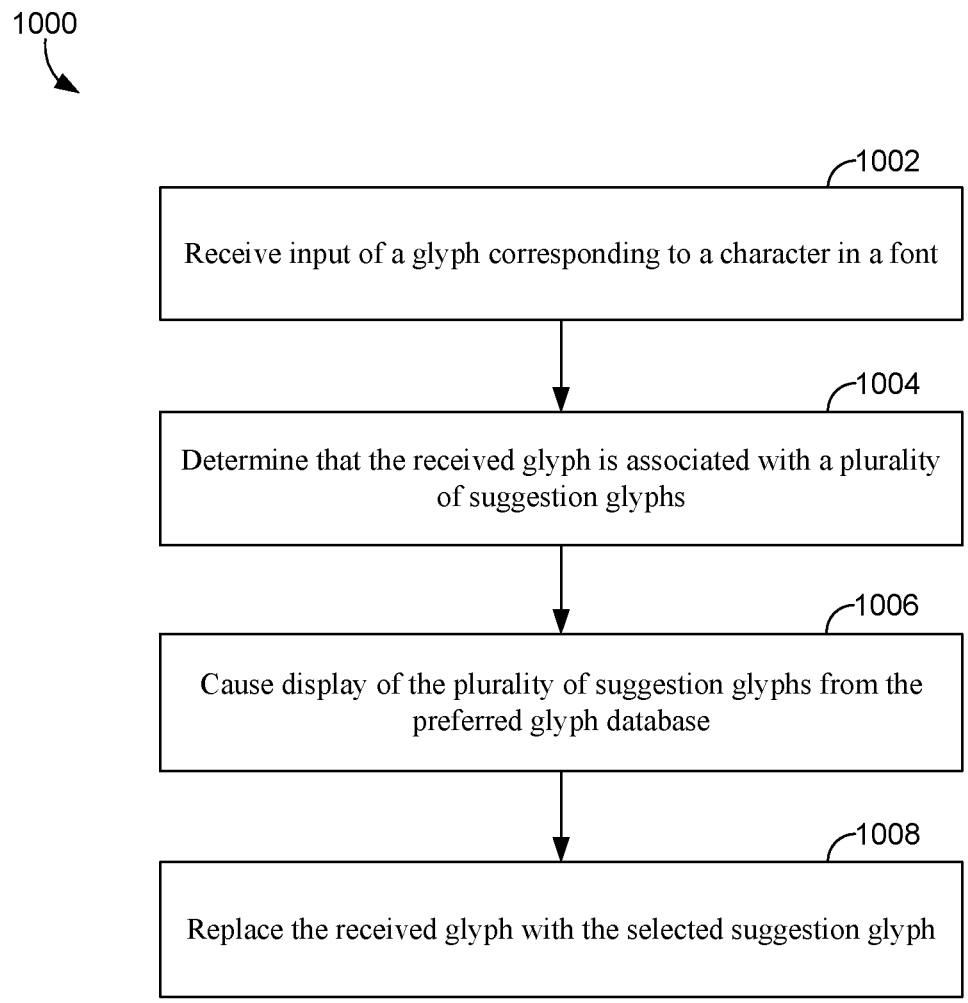
FIG. 10 is a flow diagram showing a method for determining that a glyph is associated with a plurality of alternate glyphs.

With reference to FIGS. 9 and 10, flow diagrams are provided illustrating methods 900, 1000 and 1100 for providing alternate glyphs. Each block of methods 900 and 1000, and any other methods described herein, comprise a computing process performed using any combination of hardware, firmware, and/or software. For instance, various functions can be carried out by a processor executing instructions stored in memory. The methods can also be embodied as computer-usable instructions stored on non-transitory computer storage media. The methods can be provided by a standalone application, a service or hosted service (standalone or in combination with another hosted service), or a plug-in to another product, to name a few. The methods 900 and/or 1000 may be implemented by the glyph replacement engine 102 as described in conjunction with at least FIGS. 1-8.

With initial reference to FIG. 9, FIG. 9 illustrates a method 900, in accordance with embodiments described herein. Method 900 can be performed, for instance, by glyph replacement engine 102 of FIG. 1. Initially at block 902, a selection of a preferred glyph corresponding to a character in a preferred font is received. At block 904, a character value associated with the character is determined. At block 904, the character value of the character is assigned to the preferred glyph. At block 906, the preferred glyph is stored in the priority glyph set. At block 908, the preferred glyph from the priority glyph set is utilized for each instance of an input associated with the character value.

With reference to FIG. 10, FIG. 10 illustrates a method 1000, in accordance with embodiments described herein. Method 1000 can be performed, for instance, by glyph replacement engine 102 of FIG. 1. Initially at block 1002, input of a glyph corresponding to a character in a font is received. At block 1004, it is determined that the received glyph is associated with a plurality of suggestion glyphs. The received glyph and the plurality of suggestion glyphs correspond to the character and a plurality of different fonts stored in a preferred glyph set. At block 1006, the plurality of suggestion glyphs from the preferred glyph database are displayed. The plurality of suggestion glyphs are suggestions for alternatives to the received glyph. At block 1008, the received glyph is replaced with the selected suggestion glyph.

Illustrative Computing Environment

Figure 11:
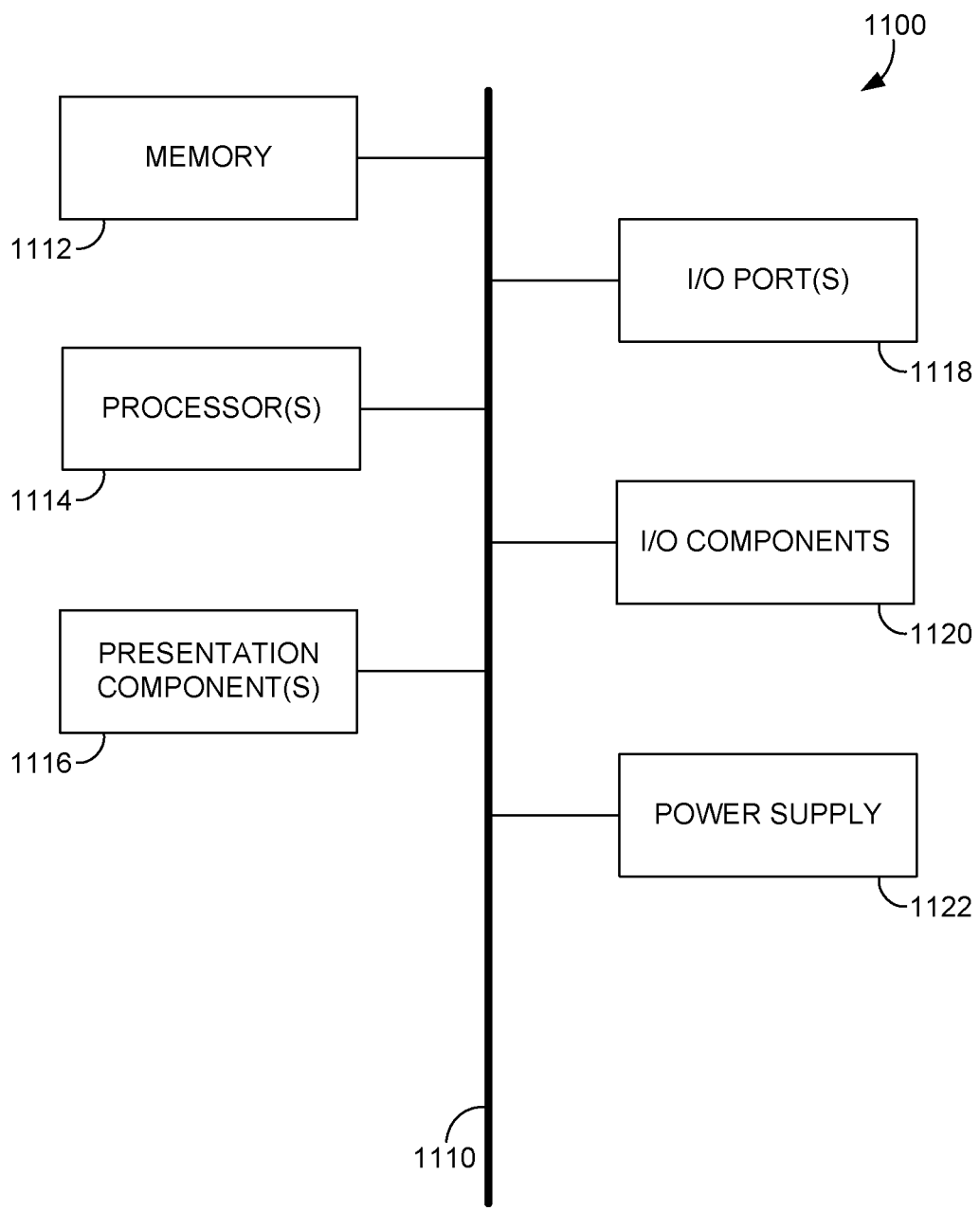
FIG. 11 is a block diagram of an exemplary operating environment in which embodiments of the present invention may be employed.

Having briefly described an overview of embodiments of the present invention, an example operating environment in which embodiments of the present invention may be implemented is described below in order to provide a general context for various aspects of the present invention. Referring initially to FIG. 11 in particular, an example operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output ports 1118, input/output components 1120, and illustrative power supply 1122. Bus 1110 represents what may be one or more buses (such as an address bus, data bus, or combination thereof). The various blocks of FIG. 11 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 11 is merely illustrative of an example computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of non-transitory computer-readable media. Non-transitory computer-readable media can be any available media that can be accessed by computing device 1100 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes non-transitory computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 700 to be logically coupled to other devices including I/O components 1120, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. A method comprising:
causing a user interface to present a first panel visualizing default glyphs configured to render by default for characters in a font;
in response to receiving a first input selecting from the first panel one of the default glyphs representing a character of the characters, causing the user interface to present a second panel visualizing a priority glyph set representing a default glyph and alternative glyphs for the character;
in response to receiving a second input selecting from the second panel a preferred glyph from the alternative glyphs, updating the default glyph representing the character in the priority glyph set to be the preferred glyph; and
in response to receiving text after updating the default glyph, applying the font to the text using the updated default glyph in the priority glyph set for each character of the text having a character value corresponding to the character.

2. The method of claim 1, further comprising, in response to input selecting an applied glyph from the text, causing presentation of at least one suggestion glyph identified using a neural network to compute a measure of similarity between the applied glyph and the at least one suggestion glyph.

3. The method of claim 1, further comprising, in response to input selecting an applied glyph from the text, causing presentation of at least one suggestion glyph identified based on a measure of similarity between corresponding feature vectors representing the applied glyph and the at least one suggestion glyph.

4. The method of claim 1, further comprising, in response to input selecting an applied glyph from the text, causing presentation of at least one suggestion glyph identified using a neural network to compute a measure of similarity between corresponding feature vectors representing the applied glyph and the at least one suggestion glyph.

5. The method of claim 1, further comprising:
receiving a selection of a plurality of preferred glyphs, each having a corresponding character value;
storing the plurality of preferred glyphs in the priority glyph set, the plurality of preferred glyphs corresponding to the character; and
utilising at least one of the plurality of preferred glyphs from the priority glyph set on each instance of a second input character that corresponds to the character.

6. The method of claim 1, further comprising:
based on receiving an instance of a character of the text having a character value corresponding to the character, determining that the character value is included in the priority glyph set and is associated with the preferred glyph; and
replacing the default glyph with the preferred glyph.

7. The method of claim 1, further comprising;
based on receiving a second input character that corresponds to a second character value
rendering a corresponding default glyph corresponding to the second character value in the text.

8. The method of claim 1, further comprising:
determining that a glyph is not associated with any particular character value;
accessing a base-glyph associated with the glyph, wherein the glyph is an alternate glyph of the base-glyph; and
extracting a corresponding character value associated with the base-glyph.

9. The method of claim 1, further comprising:
displaying a set of alternate glyphs associated with a selected glyph; and
rendering an alternate glyph, wherein the alternate glyph is selected from the set of alternate glyphs.

10. One or more computer storage media storing computer-useable instructions that, when executed by a computing device, cause the computing device to perform operations comprising:
receiving input of a glyph corresponding to a character in a font;
identifying a plurality of suggestion glyphs based on a measure of similarity between a feature vector, computed by a neural network and that represents the received glyph, and feature vectors that represent the plurality of suggestion glyphs, wherein the received glyph and the plurality of suggestion glyphs correspond to the character and a plurality of different fonts stored in a preferred glyph set;
causing display of the plurality of suggestion glyphs from the preferred glyph set, wherein the plurality of suggestion glyphs are suggestions for alternatives to the received glyph; and
upon selection of a suggestion glyph from the plurality of suggestion glyphs, replacing the received glyph with the selected suggestion glyph.

11. The computer storage media of claim 10, the operations further comprising:
triggering a similarity engine to identify a set of suggestion glyphs for the received glyph; and
identifying the plurality of suggestion glyphs from the set of suggestion glyphs.

12. The computer storage media of claim 10, the operations further comprising:
accessing a character group, wherein the character group includes a collection of suggestion glyphs with associated graphemes; and
calculating the feature vectors for the plurality of suggestion glyphs in the character group.

13. The computer storage media of claim 10, the operations further comprising:
accessing a classification database, wherein fonts are organized based on extracted traits;
determining the character is included in a selected class of fonts; and
determining the plurality of suggestion glyphs for the character.

14. The computer storage media of claim 10, the operations further comprising:
accessing a suggestion glyph set, wherein the suggestion glyph set comprises at least one preferred glyph representing a corresponding character in a preferred font.

15. A computer system comprising:
one or more hardware processors and memory storing computer program instructions that, when executed by the one or more hardware processors, cause the one or more hardware processors to perform operations comprising:
causing a user interface to present a first panel visualizing default glyphs configured to render by default for characters in a font;
in response to receiving a first input selecting from the first panel one of the default glyphs representing a character of the characters, causing the user interface to present a second panel visualizing a priority glyph set representing a default glyph and alternative glyphs for the character;

in response to receiving a second input selecting from the second panel a preferred glyph from the alternative glyphs, updating the default glyph representing the character in the priority glyph set to be the preferred glyph; and in response to receiving text after updating the default glyph, applying the font to the text using the updated default glyph in the priority glyph set for each character of the text having a character value corresponding to the character.

16. The computer system of claim 15, the operations further comprising:

receiving a selection to input the preferred glyph using a second font different from the font;

receiving the character value associated with the character;

accessing the priority glyph set;

determining that the character value is included in the priority glyph set, wherein the character value is associated with the preferred glyph; and rendering the preferred glyph for the character based on determining the character value is included in the priority glyph set.

17. The computer system of claim 15, wherein the character value comprises a Unicode value for the character, and wherein the preferred glyph includes a glyph identification associated with a particular font.

18. The computer system of claim 17, wherein the Unicode value and the glyph identification are associated with the preferred glyph and stored in the priority glyph set.

19. The computer system of claim 15, the operations further comprising:

receiving a selection of a plurality of preferred glyphs, each having a corresponding character value;

storing the plurality of preferred glyphs in the priority glyph set, each preferred glyph of the plurality of preferred glyphs corresponding to a plurality of distinct characters; and utilizing at least one of the plurality of preferred glyphs from the priority glyph set on each instance of a second input character that corresponds to a distinct character of the plurality of distinct characters.

20. The computer system of claim 15, the operations further comprising:

based on receiving an instance of a character of the text having a character value corresponding to the character, determining that the character value is included in the priority glyph set and is associated with the preferred glyph; and replacing the default glyph with the preferred glyph.

\* \* \* \* \*